United States Patent
Chou et al.

(10) Patent No.: US 7,447,134 B2
(45) Date of Patent: Nov. 4, 2008

(54) OPTICAL DISK DRIVE SIGNAL CALIBRATION METHOD AND DEVICE FOR THE SAME

(75) Inventors: Chia-Hua Chou, Hsintien (TW); Chih-Cheng Chen, Hsin Chu (TW)

(73) Assignee: Mediatek Incorporation, Hsin-chu (TW)

( * ) Notice: Subject to any disclaimer, the term of this patent is extended or adjusted under 35 U.S.C. 154(b) by 450 days.

(21) Appl. No.: 11/349,936

(22) Filed: Feb. 9, 2006

(65) Prior Publication Data

US 2006/0133250 A1    Jun. 22, 2006

Related U.S. Application Data

(63) Continuation-in-part of application No. 10/623,264, filed on Jul. 18, 2003.

(51) Int. Cl.
    *G11B 5/09* (2006.01)
(52) U.S. Cl. .................................. 369/53.26
(58) Field of Classification Search .............. None
    See application file for complete search history.

(56) References Cited

U.S. PATENT DOCUMENTS

| 5,060,208 A | 10/1991 | Nagai et al. |
| 5,675,600 A | 10/1997 | Yamamoto et al. |
| 6,538,966 B1 * | 3/2003 | Hanks ..................... 369/47.28 |
| 6,944,109 B2 * | 9/2005 | Wang et al. .............. 369/53.26 |
| 7,349,310 B2 * | 3/2008 | Chen et al. ............... 369/53.15 |
| 2001/0043534 A1 | 11/2001 | Gyo |
| 2002/0176333 A1 * | 11/2002 | Lin ......................... 369/44.29 |

\* cited by examiner

*Primary Examiner*—Joseph Feild
*Assistant Examiner*—Joseph Haley
(74) *Attorney, Agent, or Firm*—Birch, Stewart, Kolasch & Birch, LLP

(57) ABSTRACT

The present invention is described for compensating a signal which is transmitted by a transmitting module of the optical disk drive controller through a signal channel and received and reshaped by a receiving module of the optical pickup head to calibrate the duty cycle distortion occurred. The claimed method has the steps of providing a periodic test signal, and then delaying the periodic test signal to form an adjusted test signal and adjusting a delay of an edge between the periodic test signal and the adjusted test signal instructed by a calibration signal. Afterward, the method further has the steps of transmitting the adjusted test signal to the receiving module through the signal channel, and receiving and reshaping the adjusted test signal to form a received signal, and then generating a monitor signal, finally, the method has a step of generating the calibration signal in accordance with the monitor signal.

19 Claims, 7 Drawing Sheets

OPTICAL DISK DRIVE SIGNAL CALIBRATION METHOD AND DEVICE FOR THE SAME

CROSS-REFERENCE TO RELATED APPLICATIONS

This application is a Continuation-in-Part of application Ser. No. 10/623,264, filed on 18 Jul. 2003, and entitled CALIBRATION OF LASER DIODE DRIVER FOR OPTICAL DISK DRIVE.

BACKGROUND OF THE INVENTION

1. Field of the Invention

The present invention relates to a method for calibrating the signals transmitted from an optical disk drive controller to an optical pickup head and a device for the same, and more particularly, to a calibration method and device calibrating the duty cycle distortion of the signal due to different ground voltage references between an optical pickup head and an optical disk drive controller.

2. Description of Prior Arts

Conventional optical disk drive systems consist of two major components, an optical pickup head and an optical disk drive controller. The optical pickup head comprises a laser diode and a laser diode driver for emitting a laser beam to the optical disk and a sensor for receiving a reflected beam from the optical disk. The weight of the optical pickup head is a primary issue for its movability, and thus the optical disk drive controller and the optical pickup head are separated devices in an optical read/write system.

Generally speaking, the optical disk drive controller placed along with other electronic components on a printed circuit board is fixed to the casing of the optical disk drive. The optical pickup head consisting of the laser diode driver is placed in one another printed circuit board, which is movable with respect to the optical disk drive system. The printed circuit board having the optical disk drive controller connects to the printed circuit board having the laser diode driver by a flexible cable for data/signal communication.

FIG. 1 is a functional block diagram showing the optical disk drive controller 10 and the optical pickup head 15. The optical disk drive controller 10 controls operations of the optical disk drive such as the rotation speed, start-up, stop, etc. Signals generated by a control module 16 are transmitted to the laser diode driver 12 through signal channels 18. Herein, a signal channel refers to the route for signal transmission, including the signal transmitting circuitry in the optical disk drive controller 10 (such as the circuitry on the printed circuit board), the flexible cable, and the signal transmitting circuitry in the optical pickup head 15.

FIG. 2 illustrates a conventional laser diode driver 12. The laser diode driver 12 receives three power control signals, three write strategy signals and two high-frequency modulation parameters, and one high-frequency modulation signal (OSCEN) from the optical disk drive controller 10. The three power control signals are the read power control signal (RADJ), the first write power control signal (WADJ1) and the second write power control signal (WADJ2), while the three write strategy signals are RCLK, WCLK1 and WCLK2 and the two high-frequency modulation parameters are FADJ and AADJ. Thereafter, the laser diode driver 12 generates a drive signal (LDOUT) to drive the laser diode 14. The laser diode driver 12 further includes a read channel driving level generator 20, a first write channel driving level generator 22, a second write channel level generator 24, a high-frequency modulator (HFM) 26 and switches 202, 222 and 242. In addition, the laser diode driver 12 may further include a controlling signal (LD_ENABLE) and a switch 282 for enabling/disabling the drive signal (LDOUT).

The read channel driving level generator 20 receives the read power control signal RADJ and outputs a current signal $I_{RADJ}$ after some signal processing such as signal amplification and conversion from voltage to current. The current signal $I_{RADJ}$ goes through the switch 202 and drives the drive signal LDOUT. The first waveform reshaping unit 251 receives the write strategy signal RCLK, reshape the write strategy signal into a rectangular waveform, which in turn controls the on/off state of the switch 202 by the reshaped write strategy signal RCLK.

The first write channel driving level generator 22 receives the first write power control signal WADJ1 through the first write channel and outputs another current signal $I_{WADJ1}$ after some signal processing such as signal amplification and conversion from voltage to current. The current $I_{WADJ1}$ passes through the switch 222 and drives to the drive signal LDOUT. The second waveform reshaping unit 252 receives the write strategy signal WCLK1 and reshapes the signal WCLK1 into a rectangular waveform. The reshaped write strategy signal WCLK1 is used to control the on/off state of the switch 222.

The second write channel driving level generator 24 receives the second write power control signal WADJ2 through the second write channel and generates another current signal $I_{WADJ2}$ after processing, e.g. by signal amplification and conversion from voltage to current, the second write power control signal WDAJ2. The current $I_{WADJ2}$ passes through the switch 242 and drives to the drive signal LDOUT. The third waveform reshaping unit 253 receives the write strategy signal WCLK2 and reshapes WCLK2 to be a rectangular waveform. The reshaped write strategy signal WCLK2 is used to control the on/off state of the switch 242.

The high-frequency modulator 26 receives the high-frequency parameters FADJ and AADJ for respectively controlling the frequency and amplitude, then generates another current signal $I_{HFM}$ that is a high-frequency signal. The current signal $I_{HFM}$ passes through the switch 262 and drives to the drive signal LDOUT. The switch 262 is controlled by the high-frequency modulation signal OSCEN. In addition, the laser diode driver 12 can further includes a switch 282 controlled by the controlling signal LD_ENABLE to enable or disable the drive signal LDOUT.

Refer to FIGS. 3a to 3e, the timing diagrams illustrating waveforms of signals RCLK, OSCEN, WCLK1, WCLK2 and LDOUT of laser diode driver 12 in FIG. 2. As usual, the horizontal axis represents the time axis, while the vertical axis represents the signal level axis. During the data reading stage 32, the light intensity of the laser beam emitted from the laser diode 14 is relative lower and only the read power control signal RADJ is activated. The signal level of the read strategy signal RCLK is at "high" level to turn on the switch 202, while the write strategy signals WCLK1 and WCLK2 are at "low" level to turn off the switches 222 and 242. In the meantime, the high-frequency modulation signal OSCEN is at "high" level to turn on the switch 262. Consequently, the drive signal LDOUT during the data reading stage 32 is as shown in FIG. 3e.

During the data writing stage 34, the laser beam intensity is increased to a level higher than that during the data reading stage and the first write power control signal WADJ1 and the second write power control signal WADJ2 will be activated during the data writing stage. The write strategy clock RCLK is at "high" level to turn on the switch 202, while the write strategy signals WCLK1 and WCLK2 will be switching from "high" to "low" or vice versa according to the predetermined write strategy. As a result, switches 222 and 242 are turned on/off accordingly. The high-frequency modulation signal OSCEN is at "low" level to turn off the switch 262. The exemplar drive signal LDOUT at the data writing stage 34 is shown in FIG. 3e.

Due to the signal transmission characteristics and the different ground voltage references between the optical disk drive controller and the optical pick-up head, the duty cycle of the signal received by the laser diode driver 12 is not identical to that of the transmitted one. And, the higher the signal frequency is the larger the duty cycle distortion will be. As shown as in FIG. 3d, the transmitted write strategy signal is WCLK2, the signal received by the laser diode driver 12 is WCLK2* with duty cycle distorted. Then the drive signal LDOUT* generated by the laser diode driver 12 is distorted, which will degrade the performance of the optical disk drive.

FIG. 4 shows the waveforms 100 of the transmitted signal, the received signal, and the reshaped received signal transmitted from the control module 16, and the waveform 102 of the signal received at the laser diode driver 12, and the waveform 104 of the reshaped received signal. Basically the waveform 100 of the signal transmitted from the control module 16 is pretty close to an ideal rectangular waveform with two voltage values of $V_H$ and $V_L$. However, the signal received by the laser diode driver 12 is no longer an ideal rectangular waveform due to the transmission characteristics of the signal channel. FIG. 4 shows that the signal waveform 102 has a transition time TR from the $V_L$ to $V_H$ and another transition time TF from $V_H$ to $V_L$ and usually TR is not necessarily equal to TF.

The laser diode driver 12 reshapes the received waveform 102 so as to have the reshaped waveform 104. To reshape a waveform needs a predetermined reference voltage $V_T$ which is expected to be the average of $V_H$ and $V_L$. Signal voltages higher than the reference voltage $V_T$ are reshaped to be $V_H$ and signal voltages lower than $V_T$ are reshaped to be $V_L$. Obviously, different $V_T$ will cause the reshaped waveform to have different duty cycle. As mentioned earlier, optical pickup head 15 and the optical disk drive controller 10 are separated components and thus refer to different ground voltages. As a result, the reference voltage $V_T$ adopted by the optical pickup head 15 and the optical disk drive controller 10 are usually different, leading to the duty cycle distortion of the signal that is received and reshaped by the laser diode driver 12.

SUMMARY OF THE INVENTION

It is therefore a primary objective of the present invention to provide a method for an optical drive system for compensating signal which transmitted from the optical disk drive controller through signal channel, received and reshaped by the optical pickup head to calibrate the duty cycle distortion occurred. The duty cycle distortion is caused by transmission characteristics and different ground voltage references of the optical disk drive controller and the optical pick up head. This method includes steps as follows: adjusting the delay of a rising edge or a falling edge of a predetermined test signal having a predetermined duty cycle with respect to a calibration signal, so as to obtain an adjusted test signal; transmitting the adjusted test signal to the receiving module through the signal channel; receiving and reshaping the adjusted test signal so as to have a received signal; calculating the duty cycle distortion between the received signal and the predetermined test signal so as to have a monitor signal; and generating the calibration signal with respect to the monitor signal.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENT

For the purpose of calibrating the duty cycle distortions of the signals transmitted from the optical disk drive controller to the optical pickup head, the present invention provides a signal calibration method and a device for the same.

Figure 1:
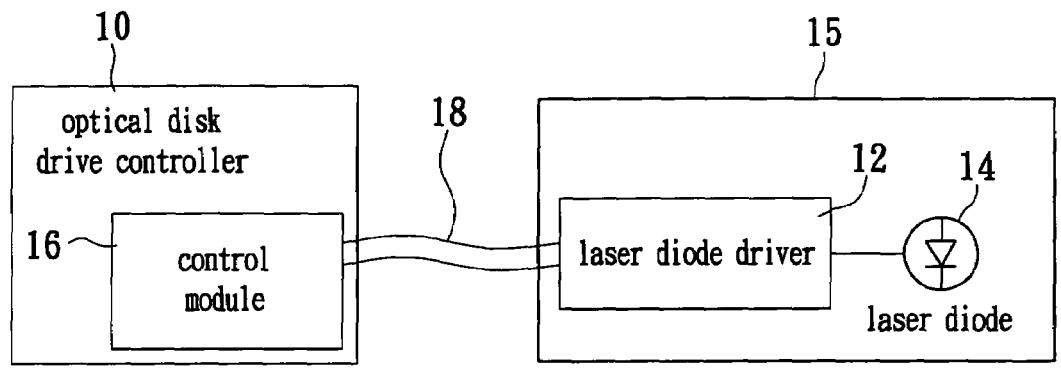
FIG. 1 is a functional block diagram showing the optical disk drive controller and the optical pickup head of the conventional optical read/write device.
Figure 2:
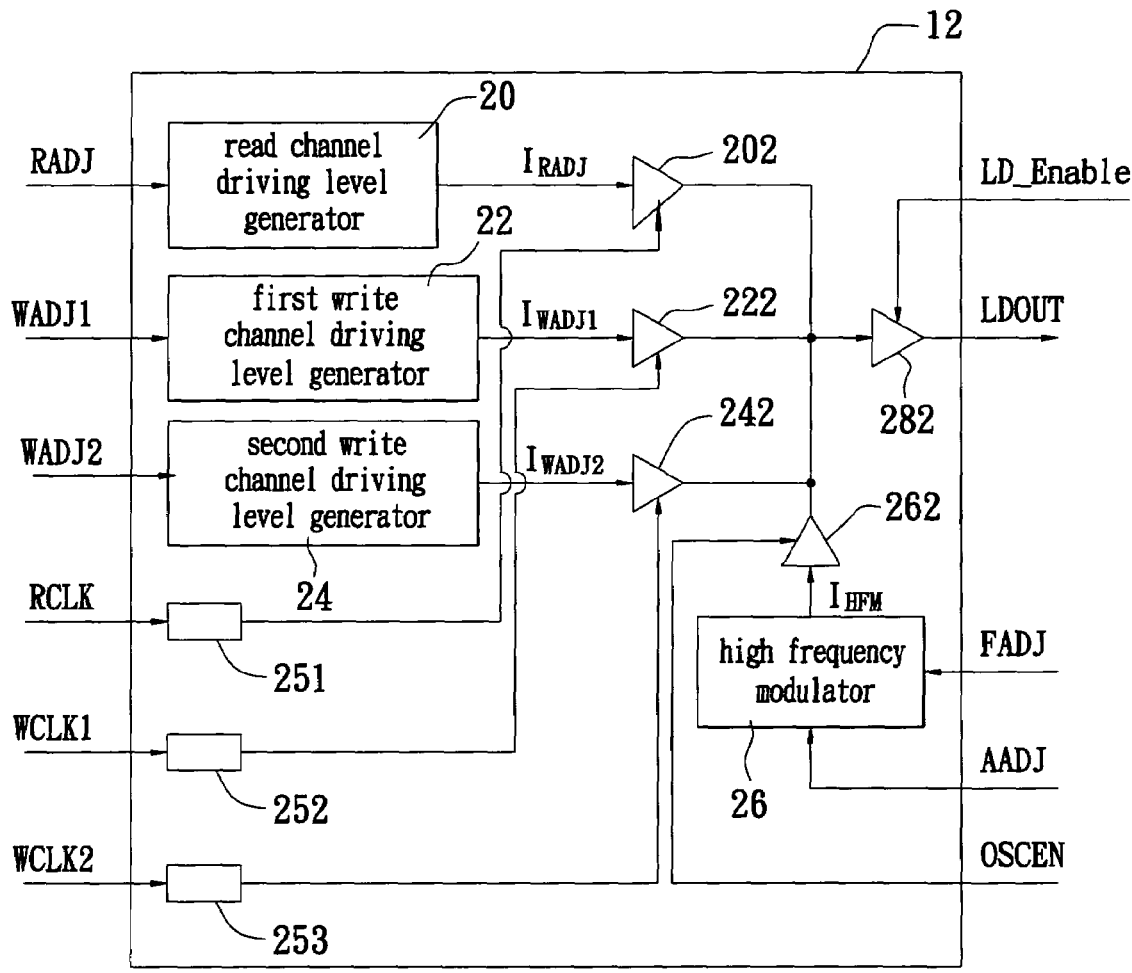
FIG. 2 is a functional block diagram showing the conventional laser diode driver.
Figure 3:
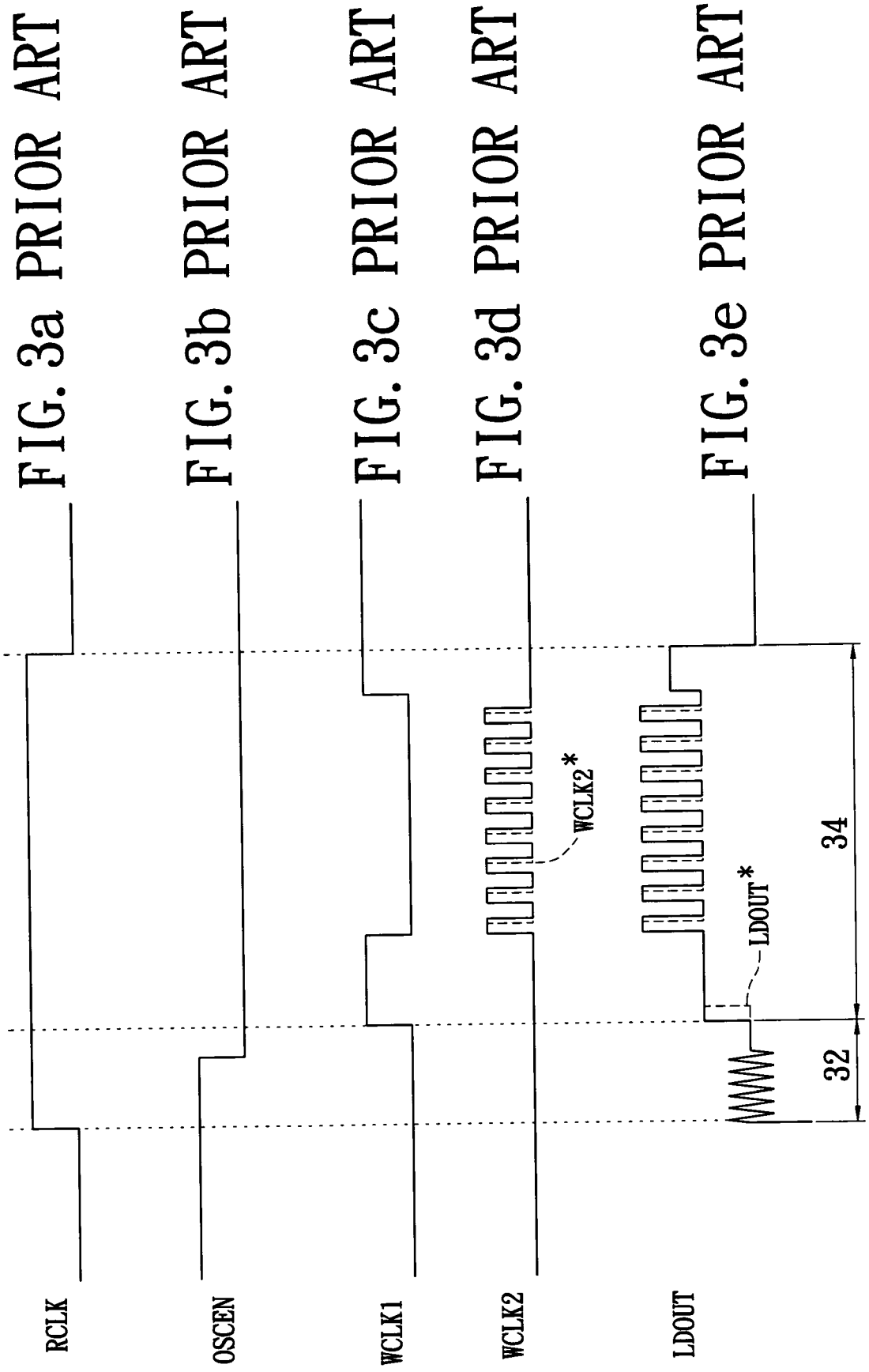
FIGS. 3a to 3e show signal waveforms within the laser diode driver shown in FIG. 2.
Figure 4:
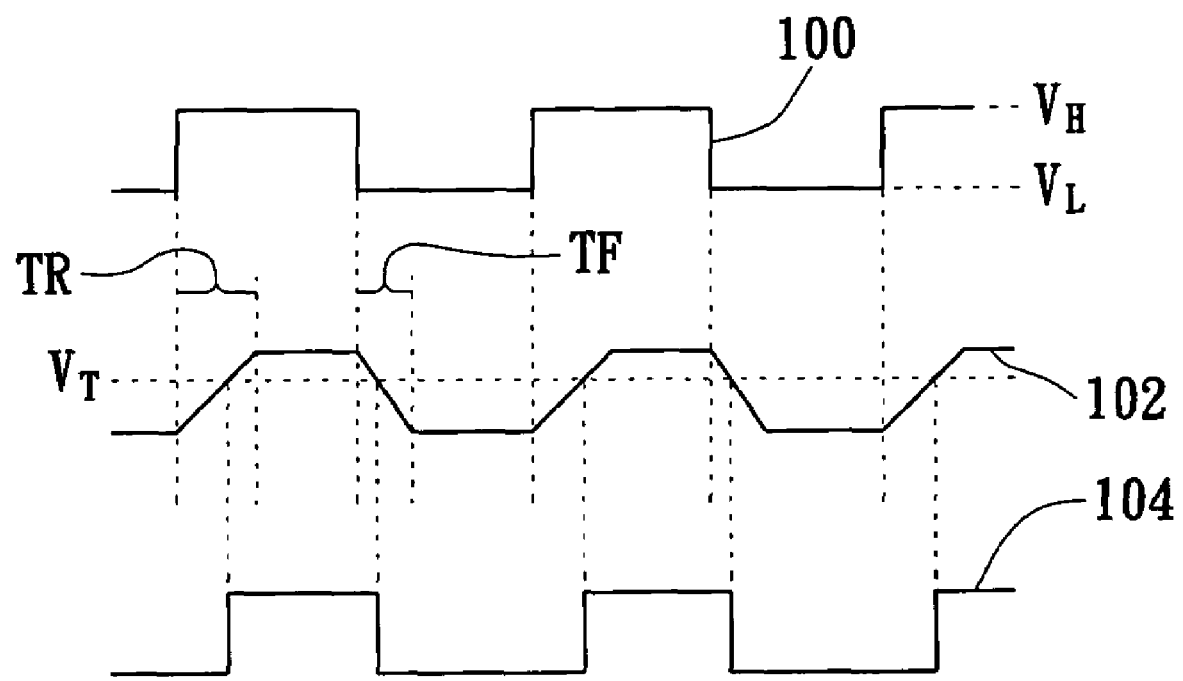
FIG. 4 shows the waveforms of the transmitted signal, the received signal, and the reshaped received signal according to the conventional art.
Figure 5:
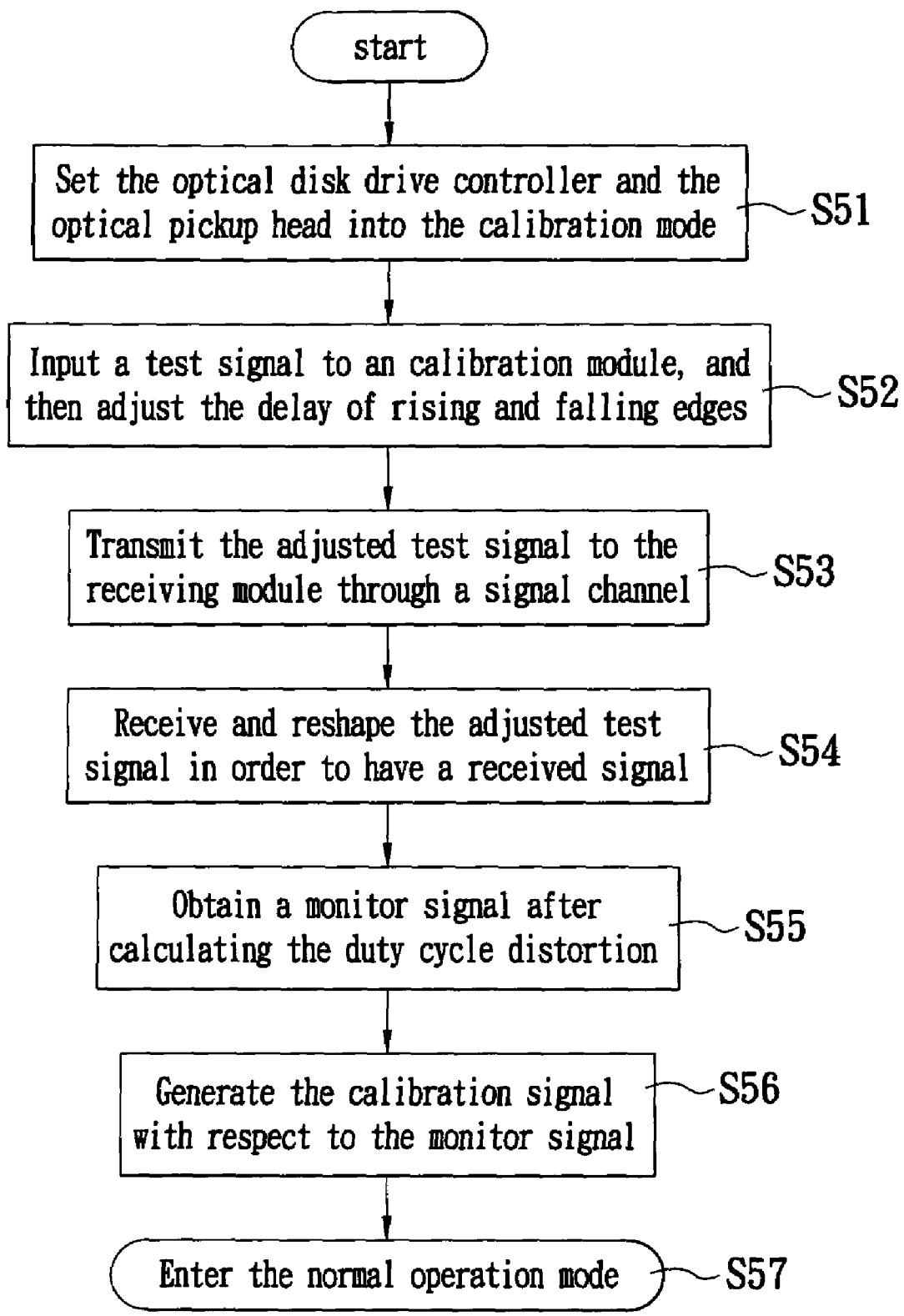
FIG. 5 is a flow chart illustrating the calibration method for calibrating the duty cycle distortion according to the present invention.

Refer to FIG. 5 of a flow chart illustrating the calibration method for calibrating the duty cycle distortions occurred between signals transmitted and received. The method includes Step S51 for setting the optical disk drive controller and the optical pickup head into the calibration mode.

The calibration begins with inputting a periodic test signal to a calibration module, in which the test signal is a periodic signal having a predetermined duty cycle, then delaying the periodic test signal to form an adjusted test signal and adjusting the delay of rising or falling edges between the periodic test signal and the adjusted test signal instructed by a calibration signal (Step S52). Thereafter the present invention method includes transmitting the adjusted test signal to the receiving module within the optical pickup head through a signal channel (Step S53). Then the method includes a step of receiving and reshaping the adjusted test signal in order to have a received signal (Step S54). After calculating the duty cycle distortion between the received signal and the test signal, the present method obtains a monitor signal (Step S55). The monitor signal comes from averaging the received signals to have a mean of the received signal and calculating the difference between a duty cycle of the received signals and an expected value, in which the expected value is the predetermined duty cycle of the test signals. In this matter, the monitor signal reflects the duty cycle distortion between the received signal and the test signal.

The preferred embodiment of the step of generating a monitor signal comprises a step of providing an expected value, the expected value is a predetermined value indicating the duty cycle of the periodic test signal, and a step of measuring a characteristic value indicating the duty cycle of the received signal, and a step of calculating the difference between the characteristic value and the expected value, finally, the embodiment has a step of generating the monitor signal according to the calculated difference. Particularly, the characteristic value is an average signal level of the received signal and the expected value is an average signal level of the periodic test signal.

For one another embodiment, the mean of the received signal is integrated to be the monitor signal. In this case, the slope of the monitor signal reflects the duty cycle distortion between the received signal and the test signal. Therefore, the present method generates the calibration signal with respect to the monitor signal (Step S56). Thereafter the optical disk drive controller and the optical pickup head enter into the normal operation mode to execute routine read/write operations (Step S57).

Steps S52 to S56 are repeatedly executed so as to progressively calibrate the duty cycle distortion between received signals and test signals until the distortion less than a predetermined value. At this point, the calibration is to be complete. Every signal transmitted through the signal channel is compensated at rising and falling edges thereof, so as to calibrate the duty cycle distortion during transmission.

Figure 6:
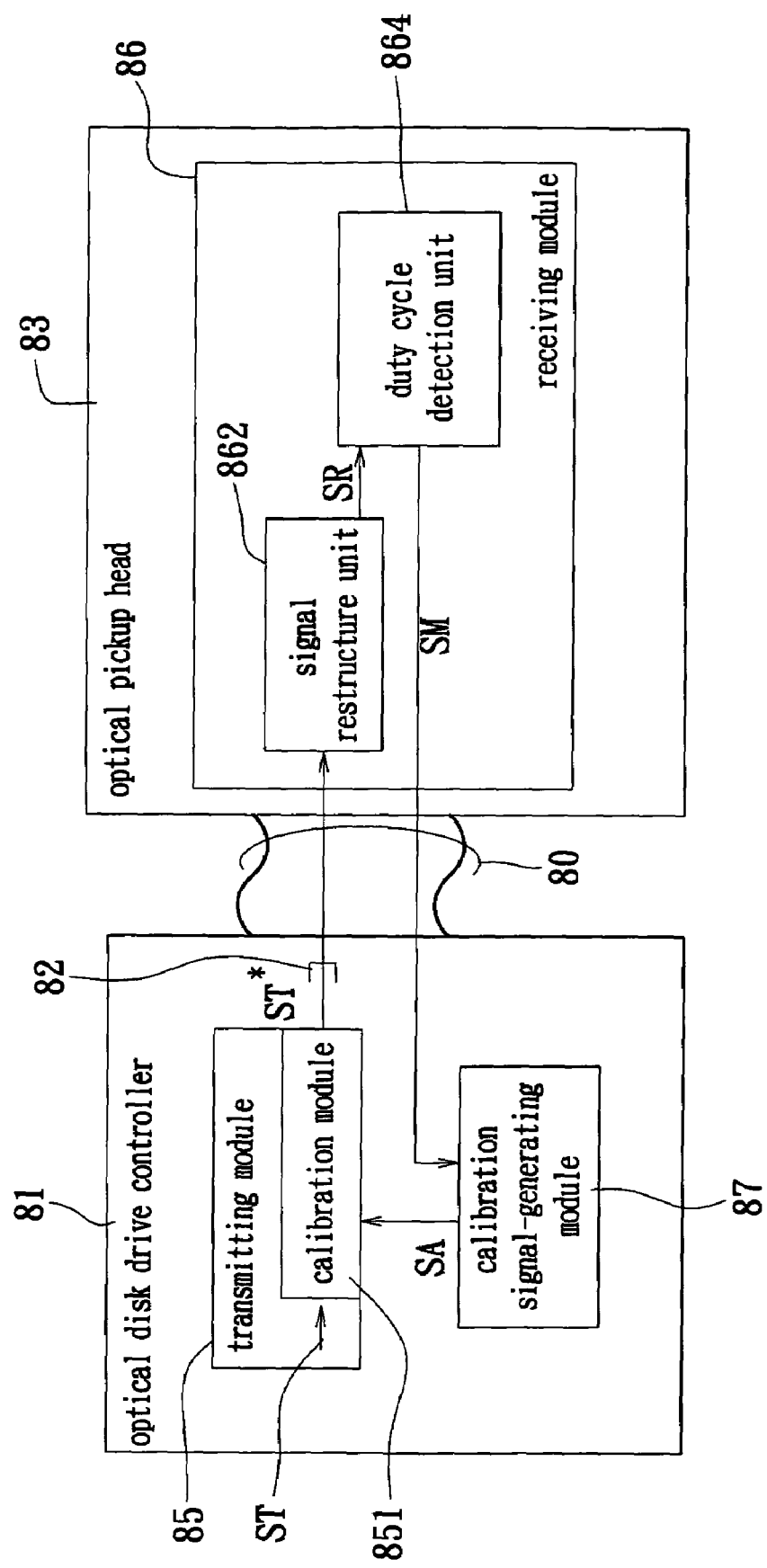
FIG. 6 is a functional block diagram showing the {optical signal calibration device} according to the present invention.

Refer to FIG. 6 a functional block diagram showing the signal calibration device according to the present invention. The optical disk drive signal calibration device includes a calibration module 851 in the transmitting module 85 of the optical disk drive controller 81, a duty cycle detection unit 864 in the receiving module 86 of the optical pickup head 83, and a calibration signal-generating module 87 in the optical disk drive controller 81. The test signal ST is a predetermined periodic signal having two voltage levels of $V_H$ and $V_L$ with a predetermined duty cycle. The calibration module 851 receives the test signal ST and adjusts the delay of the rising and falling edges between the periodic test signal and the adjusted test signal with respect to a set of adjusting parameters and then outputs an adjusted test signal. So that, the duty cycle of the adjusted test signal is increased. Furthermore, to adjust the delay of the edge of the adjusted test signal is to decrease the delay or to increase the delay of a falling edge between the periodic test signal and the adjusted test signal. Likewise, the delay of the edge of the adjusted test signal can be adjusted to increase the delay of the rising edge or to decrease the delay of the falling edge between the periodic test signal and the adjusted test signal.

According to the above description, when the monitor signal indicates the duty cycle of the received signal is smaller than the expected value, the calibration signal instructs that it's to adjust the delay of the edge between the periodic test signal and the adjusted test signal so as to increase the duty cycle of the adjusted test signal. And, when the monitor signal indicates the duty cycle of the received signal is larger than the expected value, the calibration signal instructs that it's to adjust the delay of an edge so as to decrease the duty cycle of the adjusted test signal.

The calibration device of the optical disk drive has the mentioned calibration module connected between the transmitting module and signal channel for delaying the periodic test signal, it's used to form an adjusted test signal and adjusting delay of an edge between the periodic test signal and the adjusted test signal instructed by a calibration signal. More, the calibration device has the duty cycle detection unit in the receiving module receives and reshapes the adjusted test signal transmitted over the signal channel. The unit is to form the received signal and generate the monitor signal for indicating a difference between a duty cycle of the received signal and a duty cycle of the periodic test signal. Next, the calibration device further has a calibration signal-generating module in the receiving module for generating the calibration signal in accordance with the monitor signal.

Particularly, the duty cycle detection unit comprises a mean calculating unit for averaging the received signal to obtain an average signal level of the received signal, and a subtractor for calculating a difference between the average signal level of the received signal and an expected value to form the monitor signal, wherein the expected value is a predetermined value according to an average signal level of the test signal.

The adjusted test signal passes to the receiving module 86 of the optical pickup head 83 through the signal channel 82. The signal channel 82 includes the circuitry that the signal passes within the optical disk drive controller 81, the transmission wire of the flexible cable 80 and the circuitry that the signal passes within the optical pickup head 83.

Figure 7A:
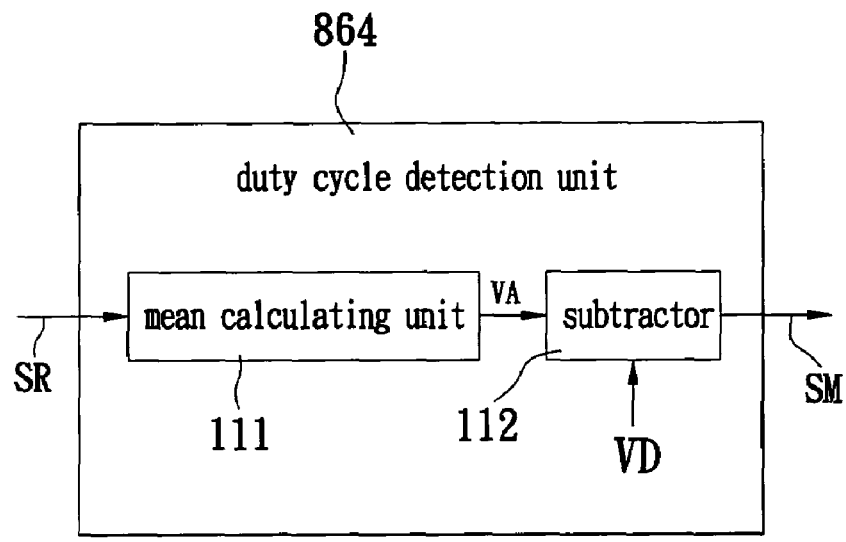
FIG. 7A shows the first embodiment of the duty cycle detection unit according to the present invention.

The adjusted test signal is received by the receiving module 86 and reshaped by a signal reshape unit 862 for reshaping the waveform to a rectangular waveform with two voltage levels of $V_H$ and $V_L$, and then outputs as a received signal SR. The duty cycle detection unit 864 detects the duty cycle of the received signal SR, compares the duty cycles of the received signal SR with that of the test signal ST and outputs a monitor signal SM with respect to the comparison results. The monitor signal SM is returned back to the calibration signal-generating module 87 of the optical disk drive controller 81 through the flexible cable 80. The calibration signal-generating module 87 generates the calibration signal SA referring to the monitor signal SM to calibrate the adjusting parameters of the calibration module 851. FIG. 7A shows a first preferred embodiment of the duty cycle detection unit. The duty cycle detection unit 864 includes a mean calculating unit 111 and a subtractor 112, in which the mean calculating unit 111 receives the received signal SR and averages the received signal SR and outputs an average signal level VA. The mean calculating unit 111 preferably is a low-pass filter. The subtractor 112 calculates the difference between the average signal level VA and an expected value VD and outputs the difference as the monitor signal SM, the expected value is the predetermined value according to the average signal level of the test signal ST. The monitor signal SM reflects the duty cycle distortion between the received signal SR and the test signal ST. The monitor signal is returned to the optical disk drive controller 81 served as the basis of further signal calibration.

Figure 7B:
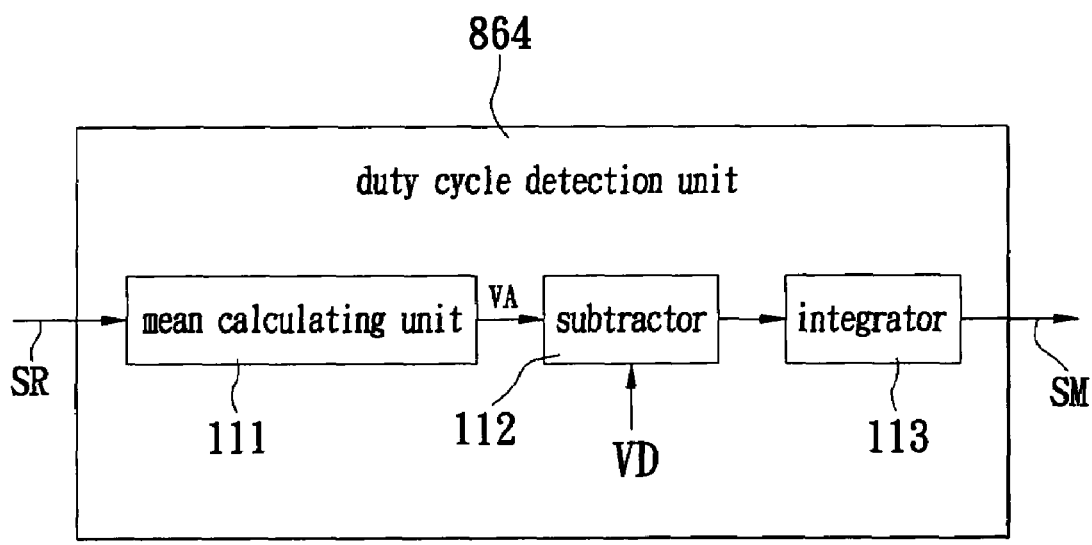
FIG. 7B shows the second embodiment of the duty cycle detection unit according to the present invention.

FIG. 7B shows another preferred embodiment of the duty cycle detection unit. The duty cycle detection unit 864 further includes an integrator 113 in addition to the components shown in FIG. 7A. The integrator 113 receives and integrates outputs of the subtractor 112, to have the monitor signal SM. In this matter, the slope of the monitor signal reflects the duty cycles distortion of the received signal SR and the test signal ST. The monitor signal SM is returned to the optical disk controller 81 through the flexible cable 80 for further signal calibration.

Figure 8:
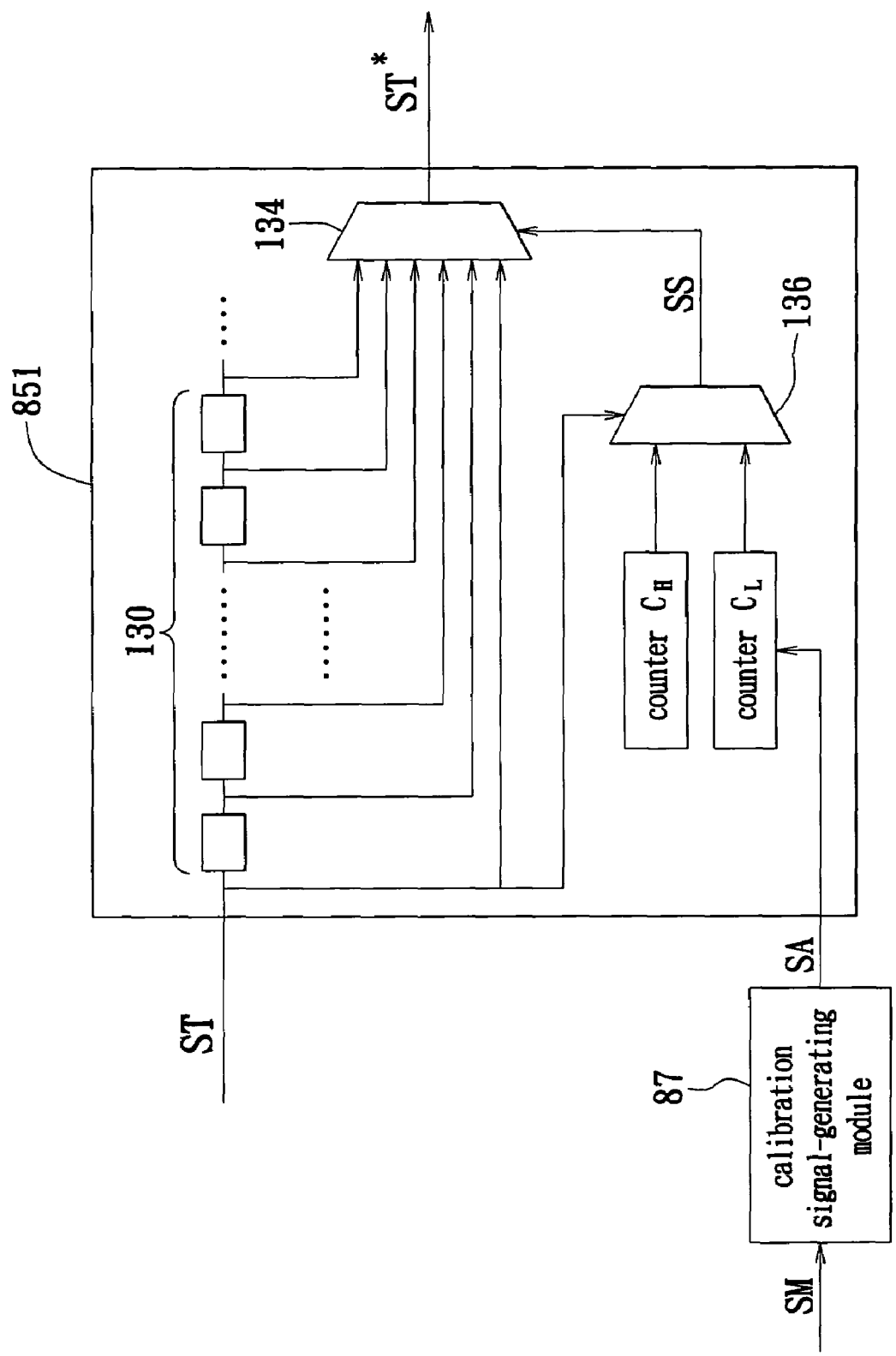
FIG. 8 is a functional block diagram showing the calibration signal-generating module.

FIG. 8 shows the calibration module according to the present invention. The calibration module 851 includes a plurality of delay units, counters $C_H$ and $C_L$, and multiplexers (MUX) 134 and 136. These delay units are connected to each other in a serial manner to form a delay line for receiving and delaying the test signal ST to generate plural delayed test signals, each of which is with distinct delays.

The multiplexer selects the plurality of delayed test signals to form the adjusted test signal and adjust a delay of an edge between the periodic test signal and the adjusted test signal. It adjusts the delay of a falling edge between the periodic test signal and the adjusted test signal according to a first counting number and adjusts the delay of a rising edge between the periodic test signal the adjusted test signal according to a second counting number. So, the MUX receives these delayed test signals, selects one of these delayed test signals based on a selection signal (SS) and outputs it as the adjusted test signal. The MUX 136 selects the counting numbers of counters $C_H$ or $C_L$ respectively with respect to the signal level of the test signal ST and outputs the selected counting number as the selection signal SS. When the test signal ST is in its "low" level the counting number of the counter $C_L$ is outputted as the selection signal SS. The counting number of the counter $C_L$ represents the delay in terms of predetermined unit between the rising edges of the adjusted test signal and the test signal.

On the other hand, when the test signal is in its "high" level, the counting number of the counter $C_H$ is outputted as the selection signal SS. The counting number of $C_H$ represents the delay in terms of predetermined unit between the falling edges of the adjusted test signal and test signal. The counting numbers of counters $C_H$ and $C_L$ thereby adjusts the duty cycle of the adjusted test signal. The calibration signal-generating module 87 receives the returned monitor signal SM through the flexible cable to generate the calibration signal SA. In FIG. 8, the calibration module 851 adjusts the counting number of the counter $C_L$ with respect to the calibration signal SA. If the monitor signal SM shows the duty cycle of the received signal SR is too large, the calibration signal SA will calibrate to increase the counting number of the counter $C_L$ (preferably, by 1 at a time) so as to lower the duty cycle of the adjusted test signal. On the contrary, when the monitor signal SM shows the duty cycle of the received signal SR is too small, the calibration signal SA will decrease the counting number of the counter $C_L$ (preferably, by 1 at a time) to increase the duty cycle of the adjusted test signal. Besides changing one counting number of $C_H$ or $C_L$ at a time, changing both counting numbers of $C_H$ and $C_L$ is also allowable.

When the above-mentioned monitor signal indicates the duty cycle of the received signal is smaller than the duty cycle of the test signal expected value, the calibration signal-generating module generates the calibration signal to change the first counting number (counting number of counters $C_H$) or the second counting number (the counting number of counters $C_L$) to increase the duty cycle of the adjusted test signal. Likewise, when the monitor signal indicates the duty cycle of the received signal is larger than the expected value, the calibration signal-generating module generates the calibration signal to change the first counting number or the second counting number to decrease the duty cycle of the adjusted test signal Those skilled in the art will readily observe that numerous modifications and alterations of the device may be made while retaining the teachings of the invention. Accordingly, the above disclosure should be construed as limited only by metes and bounds of the appended claims.

What is claimed is:

1. A calibration method adapted in an optical disc drive system comprising an optical disk drive controller and an optical pickup head, for compensating a signal that is transmitted by a transmitting module in the optical disk drive controller through a signal channel and received and reshaped by a receiving module in the optical pickup head, to calibrate the duty cycle distortion, the method comprising:
   providing a periodic test signal having a predetermined duty cycle;
   delaying the periodic test signal to form an adjusted test signal, and adjusting a delay of an edge between the periodic test signal and the adjusted test signal instructed by a calibration signal;
   transmitting the adjusted test signal to the receiving module through the signal channel;
   receiving and reshaping the adjusted test signal to form a received signal;
   generating a monitor signal for representing a difference between a duty cycle of the received signal and the predetermined duty cycle of the test signal; and
   generating the calibration signal in accordance with the monitor signal.

2. The method in claim 1, the step of generating a monitor signal comprising:
   providing an expected value, which is a predetermined value indicating the duty cycle of the periodic test signal;
   measuring a characteristic value indicating the duty cycle of the received signal;
   calculating the difference between the characteristic value and the expected value; and
   generating the monitor signal according to the calculated difference.

3. The method of claim 2, wherein the characteristic value is an average signal level of the received signal and the expected value is an average signal level of the periodic test signal.

4. The method of claim 1, wherein when the monitor signal indicates the duty cycle of the received signal is smaller than the expected value, the calibration signal instructs to adjust the delay of the edge between the periodic test signal and the adjusted test signal so as to increase the duty cycle of the adjusted test signal.

5. The method of claim 4, wherein to adjust the delay of the edge of the adjusted test signal is to decrease the delay of a rising edge between the periodic test signal and the adjusted test signal.

6. The method of claim 4, wherein to adjust the delay of the edge of the adjusted test signal is to increase the delay of a falling edge between the periodic test signal and the adjusted test signal.

7. The method of claim 1, wherein when the monitor signal indicates the duty cycle of the received signal is larger than the expected value, the calibration signal instructs to adjust the delay of an edge between the periodic test signal and the adjusted test signal so as to decrease the duty cycle of the adjusted test signal.

8. The method of claim 7, wherein to adjust the delay of the edge of the adjusted test signal is to increase the delay of a rising edge between the periodic test signal and the adjusted test signal.

9. The method of claim 7, wherein to adjust the delay of the edge of the adjusted test signal is to decrease the delay of a falling edge between the periodic test signal and the adjusted test signal.

10. A calibration device adapted in an optical disc drive system comprising an optical disc drive controller and an optical pickup head for compensating a signal that is transmitted by a transmitting module in the optical disk drive controller through a signal channel and received and reshaped by a receiving module in the optical pickup head, to calibrate the duty cycle distortion, the calibration device comprising:

a calibration module connected between the transmitting module and signal channel for delaying the periodic test signal to form an adjusted test signal and adjusting delay of an edge between the periodic test signal and the adjusted test signal instructed by a calibration signal;

a duty cycle detection unit in the receiving module, for receiving and reshaping the adjusted test signal transmitted over the signal channel to form a received signal, generating a monitor signal for indicating a difference between a duty cycle of the received signal and a duty cycle of the periodic test signal; and a calibration signal-generating module in the receiving module for generating the calibration signal in accordance with the monitor signal.

11. The calibration device of claim 10, wherein the duty cycle detection unit comprises:

a mean calculating unit for averaging the received signal to obtain an average signal level of the received signal; and a subtractor for calculating a difference between the average signal level of the received signal and an expected value to form the monitor signal, wherein the expected value is a predetermined value according to an average signal level of the test signal.

12. The calibration device of claim 11, wherein the duty cycle detection unit further comprises an integrator unit for integrating the output of the subtractor to form the monitor signal.

13. The calibration device of claim 11, wherein the calibration module comprises:

a plurality of delay units for delaying the periodic test signal to form a plurality of delayed test signals;

a first counter for storing a first counting number;

a second counter for storing a second counting number; and a multiplexer for selecting the plurality of delayed test signals to form the adjusted test signal and adjust a delay of an edge between the periodic test signal and the adjusted test signal, wherein to adjust the delay of a falling edge between the periodic test signal and the adjusted test signal is according to the first counting number and to adjust the delay of a rising edge between the periodic test signal the adjusted test signal is according to the second counting number.

14. The calibration device of claim 13, wherein when the monitor signal indicates the duty cycle of the received signal is smaller than the duty cycle of the test signal, the calibration signal-generating module generates the calibration signal to change the first counting number or the second counting number to increase the duty cycle of the adjusted test signal.

15. The calibration device of claim 14, wherein to change the second counting number is to decrease the second counting number.

16. The calibration device in claim 14, wherein to change the first counting number is to increase the first counting number.

17. The calibration device in claim 13, wherein when the monitor signal indicates the duty cycle of the received signal is larger than the expected value, the calibration signal-generating module generates the calibration signal to change the first counting number or the second counting number to decrease the duty cycle of the adjusted test signal.

18. The calibration device in claim 17, wherein to change the second counting number is to increase the second counting number.

19. The calibration device in claim 17, wherein to change the first counting number is to decrease the first counting number.

* * * * *